April 16, 1957
C. A. KITTEL ET AL
2,789,273
PRESSURIZED WAVE GUIDE APPARATUS
Filed March 23, 1954
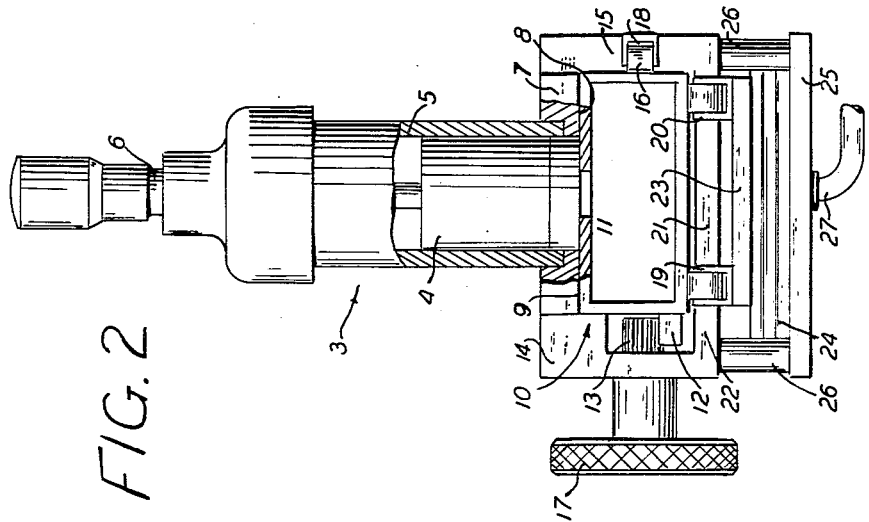
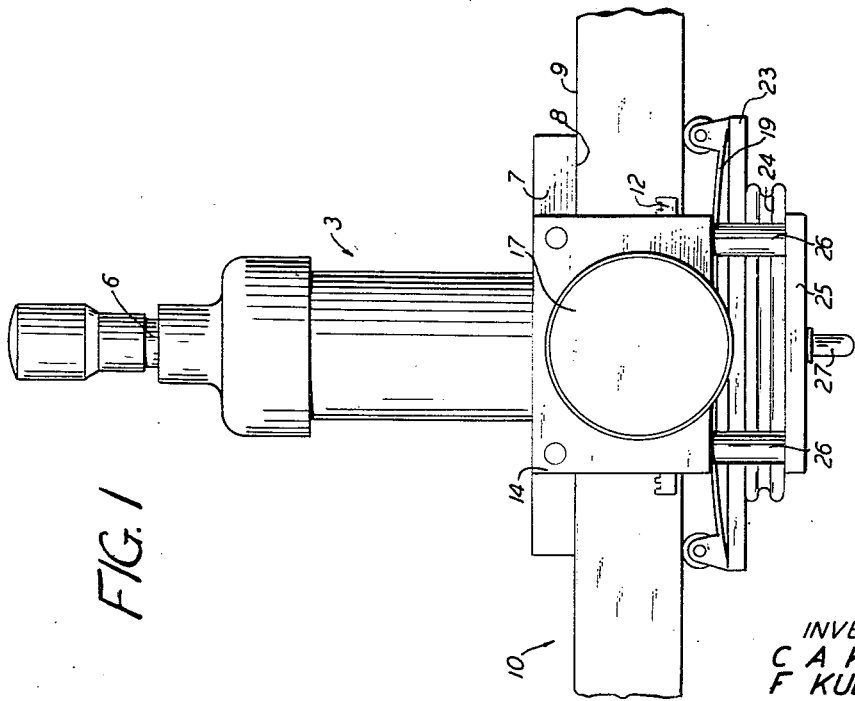
INVENTORS
C A KITTEL
F KULICK
BY
ATTORNEY

United States Patent Office 2,789,273
Patented Apr. 16, 1957

2,789,273
PRESSURIZED WAVE GUIDE APPARATUS

Claude A. Kittel, Allentown, and Frederick Kulick, Coopersburg, Pa., assignors to Western Electric Company, Incorporated, New York, N. Y., a corporation of New York Application March 23, 1954, Serial No. 418,174

5 Claims. (Cl. 333—98)

This invention relates to wave guide apparatus and particularly to a device for adapting movable apparatus to pressurized wave guides.

In testing magnetrons, standing wave introducers are used to introduce a variable mismatch in the output of the tube. The introducer is slidably mounted on a slotted wall of the associated output wave guide and is movable along the length of the slot. This mismatch produces high concentrations of power and arcing often results. To reduce the possibility of arcing, it has been necessary to pressurize the wave guide, in some cases up to 15 pounds per square inch. In so doing, the standing wave introducer (of the type known in the art), which is held in sliding contact with the wave guide only by the tension of a light spring against the wave guide, is forced out of pressure contact with the wave guide surface resulting in the introduction of errors and also producing a pressure leak in the wave guide.

It has been found that if the spring is made heavy enough to prevent leakage from a pressurized wave guide, it is very difficult to move the introducer along the guide when it is not pressurized.

It is, therefore, the object of this invention to overcome this difficulty and to make the operation of such apparatus substantially independent of the wave guide pressure.

According to the general features of the invention, a pressure sensitive device is mounted rigidly to the associated wave guide apparatus and is connected to the pressurizing source of the wave guide to react externally on the wall of the wave guide opposite the slot so that the internal wave guide pressure which tends to lift the apparatus off the wave guide is offset by an opposing force exerted by the pressure sensitive device. The total force developed by the device is made either equal to or slightly greater than that on the apparatus whereby the sliding friction between the surfaces of the wave guide and the apparatus is maintained substantially constant for any wave guide pressure.

These and other features of the invention will be more fully understood from the following detailed description taken in conjunction with the accompanying drawing in which:

Fig. 1 is a side view of the wave guide and a standing wave introducer modified in accordance with the invention; and Fig. 2 is a transverse view of the wave guide showing the standing wave introducer partially in section.

Referring now to the drawing, the standing wave introducer 3 comprises a piston 4 in a cylinder 5, a micrometer mechanism 6 for varying the position of the piston 4, a block 7 having a hole therein corresponding to the cylinder opening and having a smooth surface 8 for making intimate sliding contact with the top flat surface 9 of the wave guide 10. The block 7 seals slot 11 in the top wall of the wave guide from the atmosphere when the introducer is positioned anywhere along the slot.

The standing wave introducer 3 is moved longitudinally along the wave guide 10 over the slot 11 by means of a hand wheel 17 and a pinion 13 mounted on a side bracket 14 of the introducer, the pinion engaging a rack 12 on the side wall of the wave guide. A corresponding side bracket 15 of the introducer is disposed on the opposite side of the wave guide for supporting a lever spring 18 having on each end thereof wave guide engaging rollers 16, one of which is visible in Fig. 2. These spring biased rollers keep the introducer assembly from cocking and jamming when moved longitudinally along the wave guide.

To keep the surface 8 of block 7 in intimate or pressure sliding contact with surface 9 of the wave guide, lever springs 19 and 20, which are similar in construction to spring 18 and which also have wave guide engaging rollers on their ends, are provided for exerting pressure against the bottom surface of the wave guide. These springs are mounted to cross member 22 which bridges side brackets 14 and 15 of the introducer. The ends of springs 19 and 20 are deflected downwardly as shown and engage a floating end seal plate 23 of an expandable bellows 24 which has an opposing end seal plate 25 mounted rigidly to the cross member 22 of the introducer assembly by posts 26. The plates 23 and 25 are soldered to the bellows 24, the solder extending completely around the bellows thereby insuring a tight pressure seal. A hole is provided in plate 25 for tubing 27 which is connected either to the wave guide pressurizing source, directly to the wave guide or to any source which varies in proportion to the wave guide pressure. When pressure is applied to the wave guide, the pressure simultaneously applied to the bellows will cause the bellows to expand and apply force to the ends of springs 19 and 20 in proportion to the pressure in the wave guide. This force will offset the pressure from the wave guide on the piston 4 of the standing wave introducer. The force transmitted to the springs 19 and 20 may be any value required, by proper choice of the diameter of the bellows used. For any wave guide pressure then, the sliding friction between the surfaces 8 and 9 may be maintained substantially constant so that the standing wave introducer can be easily moved along the wave guide.

While the invention has been described as applied to a standing wave introducer for purposes of illustration, it is to be understood that it is applicable to any other apparatus bridged across a wave guide and slidable thereon and subject to the pressure of the wave guide such as, for example, the wave meter of Patent 2,439,527 issued April 13, 1948 to C. Paulson. Numerous other arrangements may be readily devised by those skilled in the art which will embody the principles of the invention and fall within the spirit and scope thereof.

What is claimed is:

1. The combination with a gas filled wave guide having on one side a longitudinal slot, apparatus subject to the pressure of the gas in the wave guide slidably mounted on the guide in operative relation to the slot and means for varying the gas pressure in the guide, of holding means attached to the apparatus engaging the guide on the side opposite the slot for holding the apparatus on the guide, a fluid actuated member responsive to pressure variations in the wave guide connected to the holding means for exerting a force thereon to offset the lifting force of the wave guide gas pressure on the apparatus.

2. A mechanism for use with a pressurized wave guide having a slotted surface for holding apparatus subject to the pressure of the wave guide in movable operative relation to the slot comprising an expandable fluid operated device subjected to the pressure of the wave guide, means for mounting the device to the apparatus and means actuated by the device for applying force to the outside of the wave guide opposite the slot.

3. A mechanism for use with a pressurized wave guide having a slotted surface for holding apparatus subject to the pressure of the wave guide in movable operative relation to the slot comprising an expandable fluid operated device, a fluid path inter-connecting the device and the wave guide, means for mounting the device to the apparatus and means actuated by the device for applying force to the outside of the wave guide opposite the slot.

4. A device for adapting movable apparatus for use on a pressurized wave guide where the pressure from the wave guide tends to force the apparatus out of pressure contact therewith, said device comprising pressure sensitive means mounted to the apparatus, a fluid path interconnecting the pressure sensitive means and the wave guide and means actuated by the pressure sensitive means for opposing the force of the internal wave guide pressure on the apparatus.

5. Apparatus for use with a pressurized wave guide having a slotted surface means for holding a standing wave introducer in intimate sliding contact with the slotted surface comprising a pressurized bellows mounted on the introducer and acting against the wave guide opposite the slot and means for automatically varying the pressure in the bellows with pressure changes in the pressurized wave guide.

References Cited in the file of this patent

UNITED STATES PATENTS

| | | |
|---|---|---|
| 64,690 | Morse | May 14, 1867 |
| 2,345,019 | Alstyne | Mar. 28, 1944 |
| 2,437,889 | Nordsieck | Mar. 16, 1948 |